Patented Feb. 10, 1953

2,628,176

UNITED STATES PATENT OFFICE 2,628,176

METHOD OF RENDERING SYNTHETIC RESINS ASTATIC

Simon A. Simon, Longmeadow, and Arthur H. Drelich, Springfield, Mass., assignors, by mesne assignments, to Chicopee Manufacturing Corporation, Chicopee Falls, Mass., a corporation of Massachusetts No Drawing. Application June 11, 1948, Serial No. 32,520. In Canada June 4, 1948

3 Claims. (Cl. 117—138.8)

This invention relates to the treatment of dielectric materials to prevent them from producing charges of static electricity.

It has long been known that various materials which are classed non-conductors of electricity and called dielectrics have the inherent property of generating static charges of electricity when rubbed with various other dielectric materials. Such electrostatic generating materials are extremely numerous, and include most of the members of that large class of materials popularly known as plastics. These latter are long chain organic polymers, frequently but not exclusively of synthetic origin, and either have been molded to form a solid or are capable of being so molded. They include saran, methacrylate resins, polyethylene and many other common materials. It is common knowledge that articles made of these materials in everyday use develop electrostatic charges, probably as a result of unavoidable friction, and that these electrostatic charges have many undesirable results which include the production of uncomfortable shocks and dangerous sparks.

As used herein, the term astatic denotes absence of the property or ability to generate, induce or accumulate objectionable electrostatic charges, and the term antistatic pertains to reducing or eliminating the property or ability to generate, induce or accumulate electrostatic charges. That is, an antistatic agent tends to produce an astatic result.

It has been proposed to render various articles and materials astatic by treating with antistatic agents which may involve coating, impregnating or possibly chemically combining the dielectric materials with antistatic agents. However, in the instances which have come to our attention, the proposed treatments have not been completely successful for one or a number of reasons. For example, some materials such as saran and polytetrafluoroethylene are so smooth and so chemically inert that it has been regarded as impossible to cause any materials either to combine with them or adhere to them. Some proposed antistatic coatings for other materials so change the properties of the material or its surface as to make it undesirable for other reasons, although it might have astatic properties. Also, although materials are known which for a time impart some degree of astatic character to some dielectrics, such astatic properties are not sufficiently lasting to be satisfactory, for example either because the antistatic materials readily wash off or are otherwise removed in normal use, or because the astatic property rapidly diminishes and disappears. Other proposed antistatic agents are hygroscopic and undesirably attract water to the surfaces to which they are applied, and this prevents their being useful in many instances.

Our invention is based on our discoveries that long chain fatty acid partial esters of hexitol anhydrides and hydroxy-polyalkylene ethers thereof, which for convenience in this description are referred to as esters, have antistatic properties; that they combine with or adhere to various dielectrics and prevent them from developing or accumulating electrostatic charges; and that these esters surprisingly combine with or adhere to various inert and smooth or slippery materials (for example saran and polyethylene) and together with such materials form astatic articles or substances. Our invention is also based upon our further discovery that certain of these esters, although readily dispersible in water, nevertheless when placed upon certain dielectrics impart a durable astatic character thereto, which resists scrubbing and washing.

Our invention is particularly useful when applied to upholstery or seat covers, especially those used in automobiles and other vehicles. Accordingly we shall describe our invention, for example only, as used with such articles and materials.

Upholstered seats are frequently covered with material intended to be durable, water resistant and easily cleanable. In recent years much effort has been directed to the provision of seat cover materials and textiles which have the desirable properties of strength, flexibility, softness, comfortable feel, great durability under extreme abuse and high resistance to chemical action. An outstanding material developed by this effort is saran. We understand this to be technically a copolymer of vinylidene chloride with vinyl chloride and/or acrylonitrile, in any case suitably combined with one of various plasticizers to impart the desired physical properties to the polymer. Such material and the method of making it are well known. It is commonly extruded into filaments which are woven into textiles, or the material may be formed as sheets and used as artificial leather. The commercial saran has a very smooth surface and is extremely inert chemically, making it highly resistant to soiling and easily cleanable, and this combined with its particular physical properties makes it an excellent seat covering material, except for its inherent undesirable electrostatic properties. Another material of similar durability and mechanical properties is polyethylene.

Rubbing saran or polyethylene lightly with common textile materials used for clothing, e. g. cotton or wool, generates particularly heavy and objectionable electrostatic charges. While the generation, transmission, induction and accumulation of electrostatic charges, and the exact causes of these phenomena are imperfectly understood, it is a demonstrated fact that when the clothing of a person is brushed over a seat covered with these various dielectric materials a heavy electrical charge is produced on the seat cover and a heavy charge, presumably equal and opposite, is produced on the person. Thereafter if the person closely approaches a grounded conductor, such as a water pipe, or a conducting mass of sufficient electrical capacity which is either not charged or is carrying a charge of opposite polarity or sign, (e. g. an isolated steel table top) a spark may pass between the person and this other object. The accompanying shock is startling, uncomfortable, frequently painful, and the spark may even be dangerous.

The phenomenon of static discharge or sparking due to seat covers is especially aggravated in the case of passengers in automobiles. We believe this may be due either to excessive friction caused by passengers sliding across the seat covers in getting into or out of cars, or to the excessive friction caused by passengers' clothing unavoidably sliding over the backs of seats in the course of uneven motion of the vehicle, or to both of these causes, combined with the condition that the passenger is normally held by the seat and insulating floor covering out of electrical contact with the large metallic masses of the car such as frame and body, which have substantial electrical capacity, and which may either be isolated or insulated in space by the tires, if dry, or may be electrically connected to the ground if the tires are wet. There is also some evidence that static is caused by simple operation of the vehicle over a smooth road. This may conceivably be due to wind friction or tire friction. In any case, after a brief period of operation of a vehicle equipped with seats covered with various dielectric materials, especially saran or polyethylene, frequently a very heavy charge may be discharged or conducted away from the passenger through a spark whenever the passenger becomes connected to the high capacity metallic masses in the body of the car, as by touching a door handle, or when the passenger steps out on the ground.

In accordance with our invention we eliminate this disadvantage in seat covers made of saran, polyethylene and other plastics by applying one of the identified esters to the plastic material. A preferred form of this application of the invention is an automobile seat cover made of fabric woven from saran monofilaments of about ten to twelve mils diameter.

At any convenient time before the car is used, and preferably after the saran is woven but before the cloth is made into seat covers, we dip, brush or spray the cloth with a dilute dispersion or solution of the appropriate ester in a volatile carrier such as water, alcohol, carbon tetrachloride or the like, and then dry the cloth. We prefer the water dispersion. We have found surprisingly that these esters adhere to, combine with (not necessary in the chemical sense) or otherwise cooperate with saran to provide a durable astatic combination. Where it is important that the article be cleanable while retaining its astatic properties, we prefer to use as the antistatic agent sorbitan monolaurate or sorbitan monostearate polyoxyethylene ether. Of these two we prefer sorbitan monolaurate because we have discovered that the combination of saran and sorbitan monolaurate is particularly resistant both to dry abrasion (incident to use) and repeated scrubbing with a stiff bristle brush and water or soap solution (incident to cleaning). These results and these properties are contrary to what is to be expected from the individual properties of the saran and sorbitan monolaurate. Thus saran is known for its very smooth surface and high degree of chemical inertness. Consequently heretofore it has been considered impossible to combine anything with saran or to make anything adhere to it. Also while sorbitan monolaurate is regarded as insoluble in water, it is readily dispersible. Consequently it is contrary to the known properties both of saran and sorbitan monolaurate that they form a combination and that this combination resists separation by active scrubbing.

Moreover very small quantities of the esters produce an astatic combination with saran and polyethylene. We have found that a concentration of ⅛% of sorbitan monolaurate in the treating dispersion produces a noticeable astatic effect, and that the saran can be rendered completely astatic by concentrations of less than 1%. The tabulation below shows the range of concentrations of a water dispersion of sorbitan monolaurate which we have found effective to render the saran astatic. A closely woven fabric of saran monofilaments was dipped in dispersions of the concentrations indicated, and after drying was rubbed briskly with a woolen cloth. The saran was then brought near a sensitive electroscope. In the tabulation +++ indicates the presence of a heavy charge, ++ a moderate charge, + a very light charge, and 0 no charge, as measured by the electroscope.

| Percent Concentration of Dispersion | Charge |
|---|---|
| 1/32 | +++ |
| 1/16 | +++ |
| 1/8 | ++ |
| 1/4 | + |
| 1/2 | 0 |
| 1 | 0 |
| 2 | 0 |

As will be seen from the tabulation, a dispersion of ⅛ of 1% markedly reduces the static charge that can be induced on the saran, while immersion in a dispersion of ½% and subsequent drying eliminates static completely. We have found that the value (+) representing a slight charge is unobjectionable and that an automobile seat treated with a dispersion of ¼% prevents or limits the formation of static to a satisfactory degree.

When applied to textile fabrics woven from single filaments of about ten or twelve mils diameter, the above dispersions, after drying, increase the weight of the fabric by about one-third of the percentage of the concentration of the dispersion. Thus the treatment with a dispersion of ½% increases the weight of the fabric about ⅙%.

We do not know the exact nature of the resulting dielectric treated with the ester. Apparently evaporation of the carrier from dispersions of low concentration does not leave a simple film or coating which can be identified and described as such. And as yet we have no positive evidence that there is any chemical combination between the dielectric and sorbitan monolaurate. The only way we can define the treated combination of saran and sorbitan monolaurate, for example, is to say that this combination has electrostatic properties substantially identical with saran which has been covered with a dispersion of sorbitan monolaurate.

As indicated by the tabulation, concentrations of sorbitan monolaurate greater than 1% satisfactorily eliminate static, but we have found that concentrations above about 2% give the saran fabric an objectionable feel. Therefore we use concentrations within the range 1/8% to 2% and prefer to use between 1/4% and 1%.

*Example I*

A saran cloth finely woven from single filaments having a diameter of 10 to 12 mils was dipped in a 1% dispersion in water of sorbitan monolaurate and dried. The resulting treated cloth showed no static by the electroscope when vigorously rubbed with woolen cloth. The fabric was made into a seat cover and applied to the seat of an otherwise conventional automobile, which was operated with two passengers under conditions known to develop objectionable static in untreated saran seats. The seat developed no static in operation. The seat cover was scrubbed vigorously with soap solution and a stiff brush. After four repeated scrubbings the seat developed no static in operation and samples showed no charge on the electroscope when briskly rubbed with woolen cloth.

*Example II*

A saran cloth finely woven from single filaments having a diameter of 10 to 12 mils was dipped in a 1/4% dispersion in water or sorbitan monolaurate and dried. The resulting treated cloth showed a slight static charge by the electroscope when vigorously rubbed with woolen cloth. A seat cover of this material was applied to the seat of an otherwise conventional automobile which was operated with two passengers under conditions known to develop objectionable static in untreated seats. The seat developed no objectionable static in operation. The seat cover was scrubbed vigorously with soap solution and a stiff brush. After four repeated scrubbings the seat developed no objectionable static in operation and samples showed only a slight charge on the electroscope when briskly rubbed with woolen cloth.

Saran cloth, polyethylene cloth and other dielectrics are rendered astatic by treating as explained above with dilute dispersions (including solutions) of other esters, including the monopalmitate, monostearate, mono-oleate, and trioleate of sorbitan and various hydroxy-polyoxyethylene ethers thereof. The hydroxy-polyoxyethylene ethers of these esters can be prepared by reacting the partial ester with a preformed polyethylene glycol or with 10 to 30 mols of ethylene oxide. Such reaction products are known in the literature and are named, for example "reaction products of sorbitan monolaurate with 20 mols ethylene oxide," or more simply "sorbitan monolaurate polyoxyethylene ether." Particular examples of the ethers of fatty acid partial esters of the hexitol anhydrides include the polyoxyethylene ethers of sorbitan monolaurate, sorbitan monopalmitate, sorbitan monostearate, sorbitan mono-oleate and sorbitan trioleate.

While the esters listed are antistatic and render saran for example completely astatic, there is considerable difference in the resistance to washing and scrubbing of the astatic property imparted to the dielectric by the ester. The astatic properties produced by some of the esters are readily destroyed by a single scrubbing. In the case of others the astatic properties will resist one laundering. However sorbitan monolaurate has been found to render the dielectric completely astatic and this astatic property has been found to be very resistant to repeated vigorous scrubbings.

*Example III*

A saran cloth finely woven from single filaments having a diameter of 10 to 12 mils was dipped in a 1% dispersion in water of the reaction product of sorbitan monostearate with 20 mols ethylene oxide. The resulting treated cloth showed no static by the electroscope when vigorously rubbed with woolen cloth. A seat cover of this fabric was applied to a conventional automobile which was operated with two passengers under conditions known to develop objectionable static in untreated seats. The seats developed no objectionable static in operation. The seat cover was scrubbed vigorously with soap solution and a stiff brush. Thereafter the seat developed observable amounts of static, and after a second scrubbing, objectional amounts of static developed.

Since there is a difference in the durability of the astatic properties imparted to the various dielectrics by the several esters, it may be advisable to use more concentrated dispersions in particular cases, for example, up to 5% where this does not produce an objectionable feel to the surface treated.

The invention claimed is:

1. The method of removing or reducing the electrostatic properties of a polymerized long chain synthetic resin which comprises applying to the surface of said resin an antistatic composition which consists of an aqueous dispersion of 1/8% to 5% by weight of an antistatic component selected from the group consisting of long chain fatty acid partial esters of hexitol anhydrides and oxyalkylene derivatives of long chain fatty acid partial esters of hexitol anhydrides, and drying the applied surface coating.

2. The method of removing or reducing the electrostatic properties of a polymerized long chain synthetic resin which comprises applying to the surface of said resin an antistatic composition which consists of an aqueous dispersion of 1/8% to 2% by weight of an antistatic component selected from the group consisting of long chain fatty acid partial esters of hexitol anhydrides and oxyalkylene derivatives of long chain fatty acid partial esters of hexitol anhydrides, and drying the applied surface coating.

3. A method according to claim 2 in which the antistatic component is sorbitan monolaurate.

SIMON A. SIMON.
ARTHUR H. DRELICH.

REFERENCES CITED

The following references are of record in the file of this patent:

UNITED STATES PATENTS

| Number | Name | Date |
|---|---|---|
| 2,081,967 | Whitehead | June 1, 1937 |
| 2,403,305 | Rossiter | July 2, 1946 |
| 2,403,960 | Stoops et al. | July 16, 1946 |
| 2,404,240 | MacLaurin | July 16, 1946 |
| 2,436,219 | MacLaurin | Feb. 17, 1948 |

OTHER REFERENCES

Atlas "Spans and Tweens," published November 1942, Atlas Powder Co.